United States Patent [19]

van der Meer

[11] Patent Number: 4,860,125
[45] Date of Patent: Aug. 22, 1989

[54] APPARATUS FOR RECORDING INFORMATION IN A MAGNETIC RECORD CARRIER WITH CONTROL TO SELECTIVELY RECORD A WHOLE OR PART OF A TRACK

[75] Inventor: Jan van der Meer, Eindhoven, Netherlands

[73] Assignee: U.S. Philips Corporation, New York, N.Y.

[21] Appl. No.: 94,222

[22] Filed: Sep. 8, 1987

[30] Foreign Application Priority Data

Sep. 10, 1986 [NL] Netherlands .................. 8602276

[51] Int. Cl.$^4$ .............. G11B 27/02; G11B 27/08; G11B 5/592
[52] U.S. Cl. .................... 360/13; 360/14.1; 360/66; 360/18; 360/27; 360/77.14; 360/77.15
[58] Field of Search .............. 360/13, 14.1, 14.2, 360/27, 18, 32, 77, 19.1, 8–10.3, 73, 66; 358/311

[56] References Cited

U.S. PATENT DOCUMENTS

| | | | |
|---|---|---|---|
| 4,533,963 | 8/1985 | Nakano et al. | 360/14.1 |
| 4,602,298 | 7/1986 | Nishitani et al. | 360/14.1 |
| 4,739,420 | 4/1988 | Odaka et al. | 360/77 |
| 4,768,106 | 8/1988 | Ito et al. | 360/14.1 |

Primary Examiner—Alan Faber
Assistant Examiner—Steven R. Garland

[57] ABSTRACT

When a record carrier (14) is inscribed for an $n^{th}$ time (n>1), in which record carrier the information is recorded in first blocks (FB) in tracks ($T_1$, $T_2$, ...) which adjoin each other and which are inclined relative to the longitudinal direction of the record carrier, each track containing at least one first block ($FB_1$) of information and at least one second block ($SB_1$) of tracking signals (f), only the first blocks of new information are written over the first blocks recorded previously in the tracks and the second blocks of tracking signals are not erased from the record carrier. These second blocks are employed for the purpose of tracking when the record carrier is inscribed for the $n^{th}$ time. In this way it is achieved that the new information is recorded exactly in the original tracks, so that perfect inserts can be made.

6 Claims, 2 Drawing Sheets

APPARATUS FOR RECORDING INFORMATION IN A MAGNETIC RECORD CARRIER WITH CONTROL TO SELECTIVELY RECORD A WHOLE OR PART OF A TRACK

The invention relates to an apparatus for recording information in adjacent tracks which are inclined relative to the longitudinal direction of a magnetic record carrier, the information being contained in first blocks in the tracks, each track containing at least one first block of information and at least one second block of tracking signals, the apparatus comprising an input terminal for receiving an electric input signal, a first unit having an input coupled to the input terminal and an output, which unit is constructed to convert the electric input signals into information suitable for being recorded on the record carrier and to arrange the information in the first blocks, a second unit having an output, for generating second blocks containing the tracking signals, a signal combination unit having a first input and a second input coupled to the output of the first unit and the output of the second unit respectively, a control input and an output, which signal combination unit is constructed to combine the first blocks and the second blocks present on the first input and the second input and to supply the combined signal to the output under the influence of a first control signal to be applied to the control input, a write unit comprising at least two write heads arranged on a rotatable head drum, which write unit has an input coupled to the output of the signal combination unit, positioning means for varying the position of the write head and the track relative to each other in a direction which is at least substantially perpendicular to the longitudinal direction of said track, under the influence of a second control signal to be applied to an input of the positioning means, first means for reading, during recording to a track, crosstalk of tracking signals from at least the preceding track to derive the second control signal, and for applying said second control signal to an output which is coupled to the input of the positioning means.

Such an apparatus is known from European Patent Application EP 113,986 A1. Said Application describes a tracking system employing a pilot signal of a specific frequency which is recorded at specific positions in the tracks. These positions are such that the track portion in which the pilot signal, hereinafter referred to as the tracking signal, is recorded adjoins a blank portion in the adjacent tracks on both sides of the relevant track. This means that a second block containing the tracking signals may comprise for example: first a blank portion, subsequently a portion with the tracking signal, and then again a blank portion. When a track is recorded, at the instant at which the first blank portion is "written", the crosstalk of the tracking signals from the preceding track is read and the levels of these tracking signals are compared with a reference value to derive the second control signal for positioning the write head. When such a second block is read during the subsequent reading of a track the crosstalk of the tracking signals from the preceding track is read, after which the crosstalk of the tracking signals from the next track is read, and the crosstalk levels of the tracking signals from the two adjacent tracks are compared with each other to derive the second control signal for positioning the head.

The known apparatus has the disadvantage that it does not enable perfect "inserts", i.e. inserts which precisely adjoin the preceding and following previously recorded information, to be realised.

It is the object of the invention to provide an apparatus which is capable of realising perfect inserts. To this end the apparatus in accordance with the invention is characterized in that if a track to be recorded on the record carrier has been inscribed previously the apparatus is adapted to write only the first block(s) of information over the first block(s) already recorded in the relevant track.

The invention is based on the recognition of the following fact. If a previously inscribed record carrier is inscribed again by means of the known apparatus not only the information but also the second block(s) containing the tracking signals is (are) again recorded in each track. In the above example this means that the blank portions in the second block are obtained by erasing the record carrier and that in fact the second block is completely re-recorded. This is necessary because the tracks which are newly recorded by the known apparatus do not coincide with the tracks recorded during the previous recording process. If no erasing is effected to obtain the blank portions in the second block, tracking signals recorded in the preceding recording process may be situated in these blank portions and may consequently disturb the tracking during pre-recording and subsequent reading.

Since the newly recorded tracks do not coincide with the tracks recorded during the previous recording process it is therefore not possible to realise perfect inserts. During reading the tracking is disturbed because the recorded tracks are not contiguous at the transition from the old information to the insert and, if applicable, at the transition from the insert to the old information. If now both the tracking signals and the information are recorded in a blank record carrier and when another recording is made on the record carrier only the information is recorded and the blocks of tracking signals of the preceding recording process are maintained (and are used for the purpose of tracking when another recording is made on the record carrier), tracks are obtained which coincide exactly with the previously recorded tracks. This provides a correct (undisturbed) transition between the old information and the newly recorded information.

It is to be noted that the invention is not only applicable to an apparatus which employs a tracking signal of a single frequency for the purpose of tracking, as is described in the foregoing and as is known, for example, from EP 113,986 A1. The invention is also applicable to apparatuses employing a different tracking system. An example of this is the four-frequency tracking system as described in, for example, British Patent Specification 1,571,874 (PHN 8728), to which U.S. Patent 4,297,733 corresponds, and the British Patent Specification 2,013,939 (PHN 9043), to which U.S. Patent 4,337,500 corresponds, both U.S. patents being owned by the assignee of this application. It is merely essential that the tracking signal and the information are recorded separately from one another to enable the information (blocks) to be erased separately. Erasing may then be effected by means of an erase head but it may also be effected by directly recording the new information over the old information.

The apparatus may be characterized further in that for determining whether a track to be written has been inscribed previously, the apparatus comprises detection means for detecting the presence of a second block of tracking signals in the relevant track and for supplying a third control signal to an output upon detection of a second block in the relevant track, in that the apparatus is adapted to record only the first block(s) of information upon the occurrence of the third control signal. If the relevant track is the track which follows the track being recorded at a specific instant, the first means may be adapted to read the crosstalk of tracking signals from the next track (if any) during recording of a track, the detection means may be coupled to a second output of the first means and may be adapted to detect the crosstalk of tracking signals from the next track (if any) and to supply the third control signal after detection of said crosstalk.

The apparatus may be characterized further in that the detection means are further adapted to supply a fourth control signal in the absence of a second block in the relevant track, and in that the apparatus is adapted to record the first and the second block(s) in the relevant track when the fourth control signal appears. If the relevant track is again the track which follows the track written at a specific instant, the absence of a second block can now also be detected by detecting the presence or absence of crosstalk of the tracking signal from the next track.

If the relevant track is the first track to be written at a specific instant, the apparatus is further adapted to be first read, prior to recording in the relevant track, the track preceding the said track, in that the first means are also adapted to read the crosstalk of tracking signals from the relevant track (if any) during reading of the preceding track, and in that the detection means are coupled to a second input of the first means and are adapted to detect said crosstalk (if any) and to supply the third control signal after detection of said crosstalk. In this way it is possible to start the recording of an insert.

In all the cases described hereinbefore the detection means are adapted to supply a fourth control signal in the absence of said crosstalk.

When information in the form of digital signals is recorded prior erasure of the track to be recorded by means of an erase head arranged before the writehead on the head drum is not directly necessary.

However, if the apparatus anyway comprises second means for previously erasing a track to be written for example because the information to be recorded is an analog signal, the apparatus may be characterized further in that the apparatus is further adapted to activate the second means to erase only the first block(s) recorded previously in the relevant track and not to erase the second block(s) recorded previously in the relevant track. If again use is made of the detection means described in the foregoing, the apparatus may be characterized further in that to this end a control input of the second means is coupled to the output of the detection means, which second means are adapted to erase only the first block(s) recorded previously in the relevant track and not to erase the block(s) recorded previously in the relevant track under the influence of the third control signal, and in that the second means are adapted to fully erase the relevant track under the influence of the fourth control signal.

The invention may be characterized further in that the output of the detection means is coupled to a second control input of the signal combination unit to apply the third or the fourth control signal, and in that the signal combination unit is adapted to inhibit, during the recording of information in the relevant track, the signal applied to its second input upon receipt of the third control signal.

Embodiments of the invention will now be described in more detail, by way of example, with reference to the accompanying drawings. In the drawings.

Figure 1:
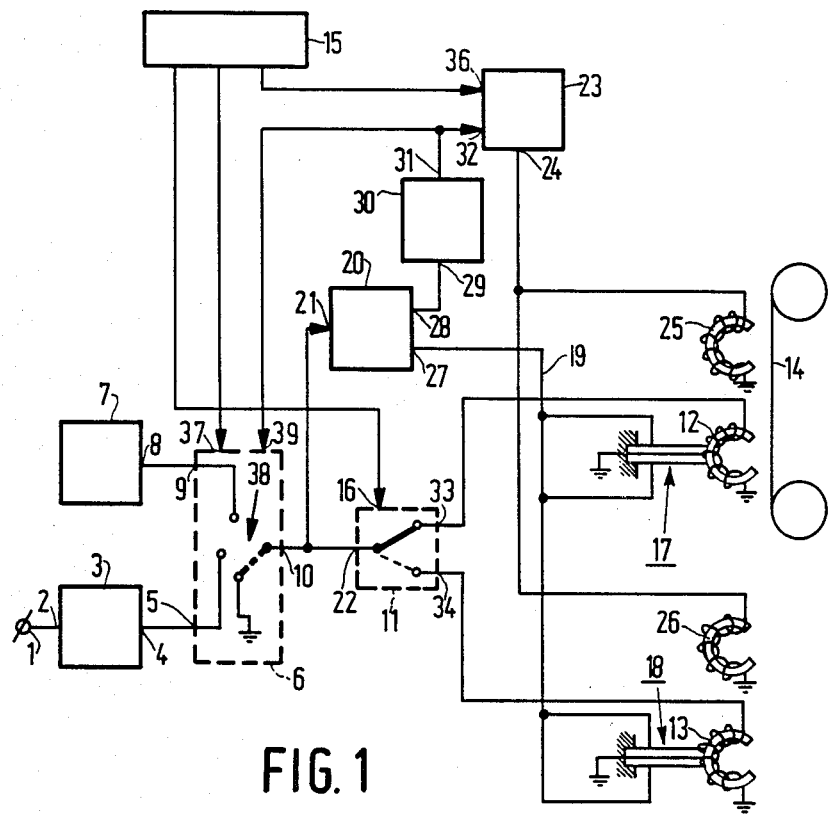
FIG. 1 shows an embodiment of the apparatus.

FIG. 1 shows an apparatus having an input terminal 1 coupled to an input 2 of a first unit 3. The output 4 of the unit 3 is coupled to a first input 5 of a signal combination unit 6. The first unit 3 is constructed to convert an electric input signal applied to the input terminal 1 into information which is suitable to be recorded on the record carrier and which is applied to the output 4 in the form of first blocks of information. The electric input signal is, for example, a video signal or (digital) data. The unit 3 can, for example, convert the video signal into a digital video signal which can be recorded in blocks in the tracks on the record carrier. In the case of (digital) data the unit 3 can, for example, arrange the data (if necessary, after digitising) in the first blocks.

An output 8 of a second unit 7 is coupled to a second input 9 of the signal combination unit 6. The second unit 7 is constructed to generate the second blocks containing the tracking signal. An output 10 of the unit 6 is coupled to write heads 12 and 13 by way of switching means 11. The write heads 12 and 13 are both mounted on a rotatable head drum (not shown) and together constitute the recording unit. The heads 12 and 13 successively write a track on the record carrier 14, which is shown only schematically in FIG. 1 but which in reality is wrapped around the head drum along a helical path. This known recording system is referred to as "helical scanning".

The switching means 11 is in the upper position, which means that the signals supplied by the combination unit 6 are recorded in a track on the record carrier 14 by the write head 12. At the instant at which the write head 12 leaves the record carrier 14 and the write head 13 starts to write on the record carrier the switching means 11 is changed over to the lower position by means of a control signal which is obtained from a central control unit 15 and which is applied to a control input 16 of the switching means 11. The write head 13 records the signals supplied by the combination unit 6 in a succeeding track on the record carrier 14. In principle, the two heads 12 and 13 may record at the same time and the switching means 11 may be dispensed with, because only one head at a time is in contact with the record carrier 14.

The apparatus comprises positioning means 17 and 18 for positioning the write heads 12 and 13 respectively in a direction which is at least substantially perpendicular to the track.

In the present example the positioning means are constructed as piezo-ceramic elements each in the form of a bimorph element which deflects in a direction perpendicular to the track under the influence of a (second) control signal applied to the bimorph element by way of the line 19, so that during reading of the record carrier the write heads can be positioned exactly on the tracks to be read. However, during information recording the positioning means are also employed for positioning the write heads relative to the record carrier, as will become apparent hereinafter.

The positioning means may also be of a different construction. Alternatively, the positioning means may influence the speed of transport of the record carrier, the write heads being mounted stationarily on the head drum. Small variations in the speed of transport of the record carrier under the influence of the second control signal enable a write head to be positioned relative to (a track on) the record carrier. The second control signal is supplied by the first means 20, which derives this control signal from the crosstalk of tracking signals from adjacent tracks. To this end the input 21 of the means 20 is coupled to the terminal 22 of the switching means 11. In this case the terminal 22 of the switching means 11 constitutes the output for the detected crosstalk of tracking signals.

The apparatus further comprises second means for erasing a recording track. The second means comprises a generator 23 for generating an erase signal, which erase signal is applied to two erase heads 25 and 26 by way of the output 24 of the generator. The erase head 25 is associated with the write head 12 and can erase a track which can subsequently be inscribed by the head 12. The erase head 26 is associated with the write head 13 and can erase a track which can subsequently be inscribed by the write head 13.

Preferably, the erase heads 25 and 26 are also provided with positioning means 17 and 18, so that the erase head 25 (26) and the associated write head 12 (13) can describe identical paths on the record carrier.

A second output of the first means 20 is coupled to an input 29 of detection means 30, which have an output 31 coupled to a control input 32 of the second means 23, for supplying the third control signal to the means 23.

Figure 2:
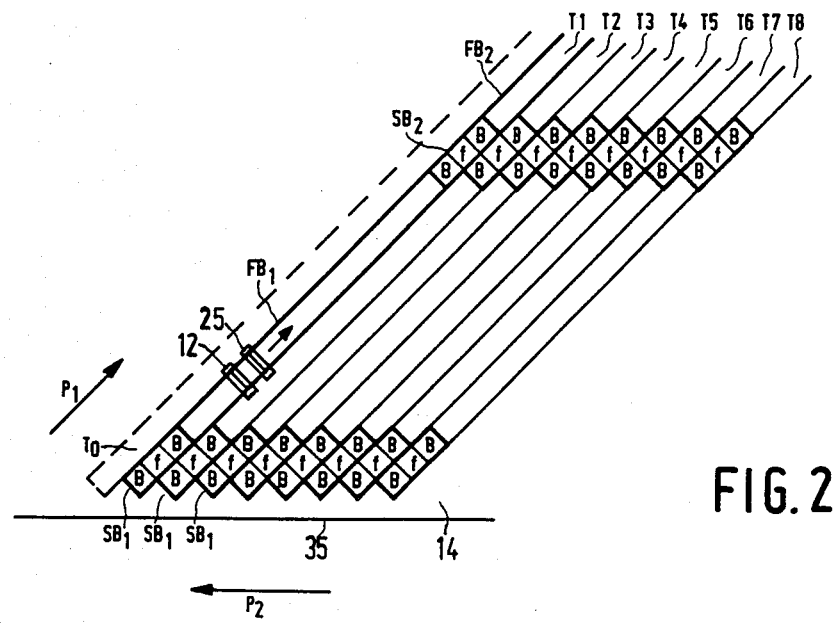
FIGS. 2 to 5 show a number of different formats with which the blocks of tracking signals and the blocks of information are recorded in tracks on the record carrier.

The operation of the apparatus will now be explained with reference to FIG. 2. In the present case the apparatus is constructed to record tracks $T_1$, $T_2$, $T_3$, . . . etc., each track, such as $T_1$, containing a second block $SB_1$, subsequently a first block $FB_1$, then a second block $SB_2$ and subsequently a first block $FB_2$. The arrow $P_1$ indicates the direction of movement of the head and the arrow $P_2$ indicates the direction of transport of the record carrier. The second blocks $SB_1$ and $SB_2$ contain the tracking signals and the first blocks $FB_1$ and $FB_2$ contain information. A second block is divided into three portions referred to as B, f and B respectively. This means that the first portion B is a blank portion in which no signal is recorded, the second portion f is a portion in which the tracking signal, that is a pilot signal of the frequency f, is recorded, and the third portion B is again a blank portion.

The tracks $T_1$, $T_2$, . . . etc. are so recorded on the record carrier 14, of which one side bears the reference numeral 35, that the second portion f of a second block, such as $SB_1$ in the track $T_2$, is situated adjacent the last blank portion of the second block $SB_1$ in the track $T_1$ and adjacent the first blank portion of the second block $SB_1$ in the track $T_3$. The same applies to the second blocks $SB_2$ in the various tracks.

How the tracks are read is described in EP 113,986, the essence being that during reading of (for example) the track $T_3$ by the head 12, which then functions as the read head, during passage of the first blank portion B in the second block $SB_1$, of tract $T_3$, the crosstalk of the tracking signal f from the second block $SB_1$ of the track $T_2$ is measured and during passage of the second blank portion $B_1$ in the second block $SB_1$ of track $T_3$ the crosstalk of the tracking signal f from the second block $SB_1$ of the track $T_4$ is measured.

Since the tracking signals are recorded in the record carrier with a specific constant level the head 12 is situated exactly on the track $T_3$ if the crosstalk of the tracking signals from the track $T_2$ has the same level as the crosstalk of the tracking signals from the tract $T_4$. This crosstalk read by the head 12 is applied to the input 21 of the means 20 by way of the switching means 11. When the crosstalk levels of the tracking signals from the two adjacent tracks $T_2$, $T_4$ are not equal the means 20 supply the second control signal to the positioning means 17 by way of the output 27, enabling the head 12 to be positioned on the track $T_3$. During reading of the second block $SB_1$ the switch 38 is in a position (not shown), in which the terminal 10 is floating.

Subsequently, a first block $FB_1$ is read from the track $T_3$ by the head 12 and by way of the switching means 11 and the signal combination unit 6 it is applied to the unit 3, the switch 38 being in the horizontal position to couple the terminals 5 and 10 to each other, which unit 3 in the present case inverts the information read from the tracks to obtain a signal corresponding to the signal originally applied to the input 1 during recording.

When for the first time a recording is made on the record carrier 14 this proceeds as follows. First of all, the apparatus reads a track on the record carrier, for example by means of the head 13. In FIG. 2 this track is designated $T_0$. The switching means 11 are then in the lower position. During this reading the detection means 30 detect the crosstalk (if any) in the track following the track $T_0$. Since the record carrier does not yet contain any tracks the detection means 30 supply the fourth control signal to the output 31.

This means that the apparatus subsequently changes over to the recording of both the first and the second blocks.

The control unit 15 supplies a control signal to the switching means 11 by way of the control input 16, so that these means are set to the upper position.

The electric signal on the input terminal 1 is converted into blocks $FB_1$ and $FB_2$ by the unit 3 and is then slightly time-compressed, enabling the second blocks $SB_1$ and $SB_2$ supplied by the unit 7 to be inserted. This insertion is deflected in the combination unit 6 under the influence of a control signal applied to the combination unit 6 by the control unit 15 by way of the control input 37, and under the influence of the fourth control signal which is applied by the detection means 30 by way of the control input 39. The combination unit 6 comprises a switch 38, which is set to the upper position under the influence of these control signals, so that the block $SB_1$ is transmitted and is applied to the write head by way of the switching means 11 to be recorded in the track $T_1$. Subsequently, the switch 38 is set to the center position and the block $FB_1$ is transmitted and applied to the write head 12, to be recorded in the track $T_1$. The switch 38 is now reset to the upper position, so that the block $SB_2$ is transmitted and is recorded in the track $T_1$ by the write head 12. Subsequently, the switch 38 is reset to the center position and the block $FB_2$ is recorded in the track $T_2$.

During the recording of the blocks $SB_1$ and $SB_2$ the detection means 30, while the blank portions B are "recorded" in these blocks, has not detected any crosstalk of tracking signals in the next track ($T_2$). Consequently, the detection means 30 still supplies the fourth control signal to the combination unit 6.

Under the influence of the control signal applied by way of the control input 16 the switching means 11 is set to the lower position. Subsequently, the write head 13 successively records the following signals in the track $T_2$: $SB_1$ (switch 38 in the upper position), $FB_1$ (switch 38 in the center position), $SB_2$ (switch 38 in the upper position), and $FB_2$ (switch 38 in the center position). It is obvious that during writing of the track $T_2$ the crosstalk of tracking signals from the track $T_1$ is measured for correctly positioning the track $T_2$ adjacent the track $T_1$.

Subsequently, the above process is repeated for recording information in the tracks $T_3$, $T_4$, ... etc.

An insert is recorded as follows. It is assumed that the write head 12 is situated in the track $T_3$ when recording of the insert on the record carrier in FIG. 2 is started. The apparatus first reads this track $T_3$. During this reading the detection means 30 detects the crosstalk of the tracking signals from the track $T_4$ in the blocks $SB_1$ and $SB_2$. Consequently, the detection means generates a third or edit control signal on the output 31. This means that the apparatus subsequently switches over to the recording of only the blocks $FB_1$ and $FB_2$ in the tracks $T_4$, $T_5$, ... etc.

Under the influence of the third control signal applied to the control input 32 and the control signal applied to the control input 36 the second means 23 is now switched on in such a way that the blocks $SB_1$ and $SB_2$ in the track $T_4$ (and also in the following tracks) are not erased and that the blocks $FB_1$ and $FB_2$ in the track $T_4$ (and also in the following tracks) are erased.

When information is recorded in the track $T_4$ (the switching means 11 consequently being in the lower position) the combination unit 6 inhibits the transfer of a block $SB_1$. This is indicated diagrammatically in FIG. 1 in that under the influence of the control signal applied to the input 37 and the third control signal applied from the detection means 30 to the control input 39 the switch 38 is set to the lower position. It is evident that it is also possible to inhibit recording of the blocks $SB_1$ and $SB_2$ in a different way. While the head 13 moves over the blocks $SB_1$ in the track $T_4$ the crosstalk signals are read from the adjacent tracks $T_3$ and $T_5$ and are applied to the means 20 by way of the switching means 11, to derive the second control signal for controlling the positioning means 17, 18.

Subsequently, the switch 38 is set to the center position and the block $FB_1$ is transferred and recorded in the track $T_4$ by the write head 13, exactly at the location where the block $FB_1$ has been recorded in the track $T_4$ during the previous recording process. The switch 38 is now reset to the lower position, so that no block $SB_2$ is recorded, and again the crosstalk of tracking signals from adjacent tracks can be measured for the purpose of tracking control. After this the switch 38 is reset to the center position and the block $FB_2$ is recorded in the track $T_4$.

Since the detection means 30 have detected crosstalk of tracking signals from the track $T_5$, the third control signal remains present on the output 31. Thus, in the track $T_6$ only the blocks $FB_1$ and $FB_2$ are recorded by the head 12 (the switching means 11 being in the upper position). This recording of only the blocks $FB_1$ and $FB_2$ continues up to and including the track $T_8$. Assuming that after the track $T_8$ there are no more tracks on the record carrier 14, the detection means 30 have not detected any crosstalk during the recording of the track $T_8$ by the head 13 at the instant at which this head 13 moves over the second blank portions B of the blocks $SB_1$ and $SB_2$. Consequently, the detection means 30 will generate a fourth or full write control signal, causing the apparatus to change over to the recording of both the blocks $SB_1$, $SB_2$ and the blocks $FB_1$, $FB_2$ to write the next track. In fact, this means that (this portion of) the record carrier is inscribed for the first time. Therefore, the apparatus changes over to recording in a manner as described in the foregoing.

Figure 3:
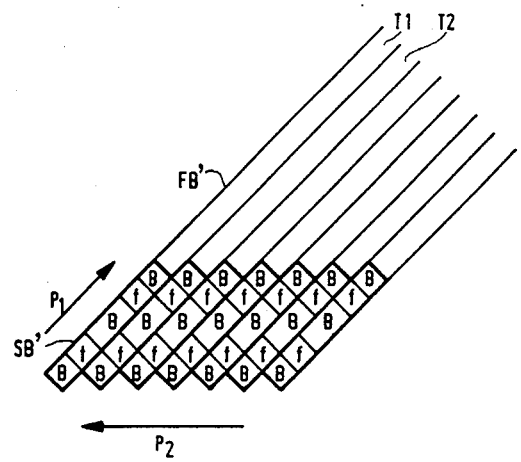
Figure 4:
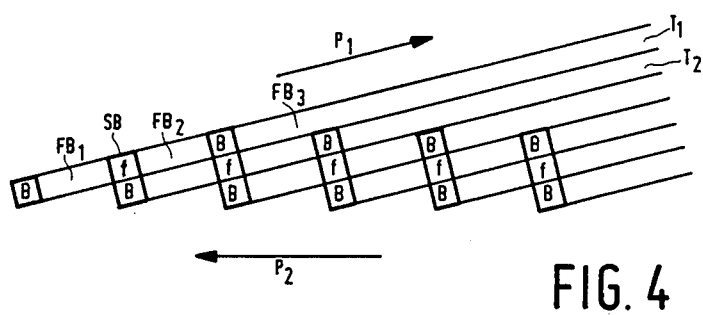
Figure 5:
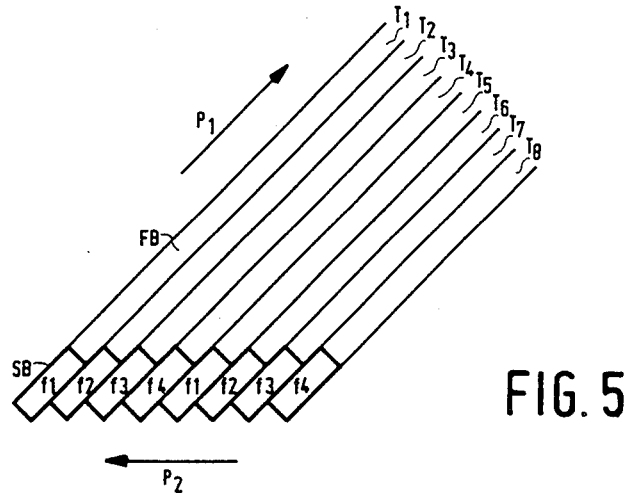

FIGS. 3, 4 and 5 show other formats enabling blocks of tracking signals and blocks of information to be recorded on the record carrier.

FIG. 3 shows second blocks SB' first comprising a blank portion B, subsequently a portion f with the tracking signal (the pilot signal of the frequency f), then again a blank portion B which is twice as long as the first blank portion, subsequently yet another portion f containing the tracking signal, and again a blank portion B which is just as long as the first blank portion. Subsequently a track, such as $T_1$, comprises a block FB' containing the information. The division of the block SB' into blank portions and portions containing the tracking signal largely resembles the division as illustrated in FIG. 4 of EP 113,986. EP 113,986 also shows another division of the track into first and second blocks FB, SB, see FIG. 3, which may also be applied here.

FIG. 4 shows yet another track configuration. Here a track such as $T_1$ comprises a blank portion B, then a first block $FB_1$, subsequently a second block SB, then a first block $FB_2$, yet another blank portion B, and after this again a first block $FB_3$. The package of two blank portions and the blocks $FB_1$, $FB_2$ and SB may be repeated further along the tracks for the reason already set forth with reference to FIG. 2.

In the track $T_2$ the first blank portion B is situated adjacent the pilot signal f of the second block SB of the track $T_1$ and the pilot signal f of the first block SB is of track $T_2$ situated adjacent the second blank portion B of the tract $T_1$. The same applies to the succeeding tracks. During re-recording in the tracks $T_1$, $T_2$ etc. information alone is recorded in the first blocks $FB_1$, $FB_2$, $FB_3$ of each track and the blank blocks B and the second blocks SB of the original recording in each track are maintained.

Finally, FIG. 5 shows a configuration where a track comprises a second block SB and a first block FB. The second block SB in the track $T_1$ contains a tracking signal in the form of a pilot signal of the frequency $f_1$. The second block SB in the track $T_2$ contains a tracking signal in the form of a pilot signal of the frequency $f_2$. Similarly, the second blocks SB in the tracks $T_3$ and $T_4$ contain tracking signals in the form of a pilot signal of the frequencies $f_3$ and $f_4$ respectively.

This sequence recurs in sets of four consecutive tracks each. As stated previously, a tracking system employing four tracking signals of four different frequencies is described in GB 1,571,874 and GB 2,013,939.

After the explanation of the operation of the apparatus shown in FIG. 1 for the format as described with reference to FIG. 2, it will be obvious to those skilled in the art that in a similar way a format as illustrated in any one of the FIGS. 3 to 5 can be realised by means of the apparatus.

Apparatus described with reference to FIG. 1 comprises second means 23 and erase heads 25, 26 for erasing (a portion of) a track. As already stated, (partly) erasing a track is not always necessary. For example, when digital signals are recorded it is not always necessary to erase a track before the new information is written over the information previously recorded in the record carrier. The second means 23 and the erase heads 25 and 26 may then be dispensed with.

What is claimed is:

1. An apparatus for recording information in adjacent tracks on a magnetic record carrier, the information being contained in first blocks in the tracks, each track containing at least one first block of information and at least one second block of tracking signals, said apparatus comprising an input terminal for receiving electric input signals, a first unit having an input coupled to the input terminal and an output, said first unit converting said electric input signals into information suitable for being recorded on said record carrier and arranging the information in said first blocks in a predetermined manner, said first unit also having an output a second unit having an output and generating second blocks containing said tracking signals, a signal combination unit having a first input and a second input coupled to the output of said first unit and the output of said second unit respectively, a central control unit generating first control signals, said signal combination unit including a control input and an output, said signal combination unit combining first blocks and second blocks received at said first input and said second input and supplying combined signals to its output in response to said first control signals, a write unit comprising at least two writing heads, said write unit having an input coupled to the output of said signal combination unit for recording first and second blocks of signals in said tracks, and detection means detecting the presence of a second block of tracking signals in a predetermined track to be recorded in, said detection means upon detecting such tracking signals supplying an edit control signal to said signal combination unit to prevent it from supplying second blocks of tracking signals to its output when said writing unit is to record in said predetermined track notwithstanding said signal combination unit may receive such tracking signals from said second unit.

2. An apparatus as claimed in claim 1, wherein said detection means supplies a full write control signal when it detects that a track which is to be recorded in lacks a second block of tracking signals, said signal combination unit in response to said full write control signal providing first and second blocks at its output.

3. An apparatus as claimed in claim 2, including reading means which during the recording information in a certain track reads cross talk of tracking signals from the track next succeeding said certain track, said detection means being coupled to said reading means and supplying said edit control signal in response to said reading means reading cross talk of tracking signals from said next succeeding track.

4. An apparatus as claimed in claim 3, wherein said detection means supplies said full write control signal in the absence of said cross talk.

5. An apparatus as claimed in claim 4, including erasing means responsive to said edit control signal to erase only first blocks previously recorded in a track when said track is to be recorded in again.

6. An apparatus as claimed in claim 5, wherein said erasing means responds to said full write control signal to erase all signals in a track when said track is to be recorded in again.

* * * * *